US012092826B2

(12) United States Patent
Micusik et al.

(10) Patent No.: US 12,092,826 B2
(45) Date of Patent: Sep. 17, 2024

(54) REVOLVING XR EYEWEAR DISPLAY

(71) Applicant: Snap Inc., Santa Monica, CA (US)

(72) Inventors: Branislav Micusik, St.Andrae-Woerdern (AT); Georgios Evangelidis, Vienna (AT); Ramzi Zahreddine, Denver, CO (US)

(73) Assignee: Snap Inc, Santa Monica, CA (US)

( * ) Notice: Subject to any disclaimer, the term of this patent is extended or adjusted under 35 U.S.C. 154(b) by 0 days.

(21) Appl. No.: 18/128,905

(22) Filed: Mar. 30, 2023

(65) Prior Publication Data
US 2024/0176144 A1    May 30, 2024

(30) Foreign Application Priority Data
Nov. 30, 2022    (GR) .............................. 20220100979

(51) Int. Cl.
*G09G 5/00* (2006.01)
*G02B 27/01* (2006.01)
*G09G 3/32* (2016.01)

(52) U.S. Cl.
CPC .......... *G02B 27/0172* (2013.01); *G09G 3/32* (2013.01); *G02B 2027/014* (2013.01); *G02B 2027/0178* (2013.01); *G09G 2360/04* (2013.01)

(58) Field of Classification Search
CPC .. G02B 27/01; G02B 27/017; G02B 27/0172; G02B 2027/014; G02B 2027/0178; G09G 3/32; G09G 2360/04
See application file for complete search history.

(56) References Cited

U.S. PATENT DOCUMENTS 5,202,675 A     4/1993 Tokimoto et al.
5,859,624 A *   1/1999 Matsumoto .......... G02B 27/017
                                                  359/633
(Continued)

FOREIGN PATENT DOCUMENTS

CN          200997253 Y        12/2007
CN          110094483 A        8/2019
(Continued)

OTHER PUBLICATIONS

"International Application Serial No. PCT/US2023/081662, International Search Report mailed Apr. 16, 2024", 4 pgs.
(Continued)

*Primary Examiner* — Joe H Cheng
(74) *Attorney, Agent, or Firm* — Schwegman Lundberg & Woessner, P.A.

(57) ABSTRACT

An eXtended Reality (XR) display system includes a Light Emitting Diode (LED) display controller, and a Light Emitting Diode (LED) near-eye display element operatively coupled to the LED display driver. The LED near-eye display element includes one or more motors and an LED array operably connected to the one or more motors. During operation, the LED display driver receives video data including a rendered virtual object of an XR experience and generates LED array control signals based on the video data, the LED array control signals causing one or more LEDs of the LED array to be energized in a sequence. The LED display driver also generates synchronized motor control signals and simultaneously communicates the LED array control signals to the LED array and the synchronized motor control signals to the one or more motors causing the LED near-eye display element to display the rendered virtual object.

20 Claims, 11 Drawing Sheets

(56) References Cited

U.S. PATENT DOCUMENTS

| | | | |
|---|---|---|---|
| 6,037,876 A * | 3/2000 | Crouch | G09F 9/33 |
| | | | 340/815.53 |
| 9,292,973 B2 * | 3/2016 | Bar-Zeev | G02B 27/0149 |
| 9,588,341 B2 * | 3/2017 | Bar-Zeev | G06F 3/013 |
| 10,395,111 B2 * | 8/2019 | Konttori | G02B 5/30 |
| 11,138,915 B2 | 10/2021 | Rohena et al. | |
| 11,308,832 B2 * | 4/2022 | Valente | G02B 27/0172 |
| 11,747,912 B1 * | 9/2023 | Colascione | G06F 3/017 |
| | | | 345/156 |
| 2006/0209542 A1 | 9/2006 | Anderson et al. | |
| 2008/0218825 A1 | 9/2008 | Song | |
| 2016/0320612 A1 * | 11/2016 | Zhang | G02B 27/017 |
| 2019/0035317 A1 * | 1/2019 | Rohena | G06F 3/167 |
| 2019/0086665 A1 * | 3/2019 | Pletenetskyy | G02B 27/0176 |
| 2021/0005123 A1 | 1/2021 | Valente et al. | |

FOREIGN PATENT DOCUMENTS

| | | |
|---|---|---|
| CN | 110112957 B | 7/2022 |
| KR | 20060084166 A | 7/2006 |
| KR | 20120001034 A | 1/2012 |

OTHER PUBLICATIONS

"International Application Serial No. PCT/US2023/081662, Written Opinion mailed Apr. 16, 2024", 8 pgs.

* cited by examiner

REVOLVING XR EYEWEAR DISPLAY

CLAIM OF PRIORITY

This application claims the benefit of priority to Greece Patent Application Serial No. 20220100979, filed on Nov. 30, 2022, which is incorporated herein by reference in its entirety.

TECHNICAL FIELD

The present disclosure relates generally to user interfaces and more particularly to user interfaces used augmented reality and virtual reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." In a hybrid form, a view of the surrounding environment is captured using cameras, and then that view is displayed along with augmentation to the user on displays that occlude the user's eyes. As used herein, the term eXtended Reality (XR) refers to augmented reality, virtual reality and any hybrids of these technologies unless the context indicates otherwise.

In order to interact with XR applications provided by an XR system or XR device, it is desirable to have a user interface.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Some see-through XR display systems use optics-based wave guides. These wave guides may have a small Field of View (FOV), may be expensive, and may consume large amounts of energy. Therefore, a need exists for an XR display system that has a larger FOV, is less expensive to produce, and consumes less energy.

In one aspect, an XR display system includes a Light Emitting Diode (LED) display controller and a Light Emitting Diode (LED) near-eye display element operatively coupled to the LED display driver. The LED near-eye display element includes one or more motors and an LED array operably connected to the one or more motors. The LED array may be inexpensive as compared to a waveguide and may be manufactured to be of arbitrary size thus creating near-eye displays with a large FOV. In addition, the power requirements of the LED array and motor may be less than that of a comparable wave guide system.

During operation, video data of the XR experience is used to generate LED array control signals that cause one or more LEDs of the LED array to be energized in a sequence. In addition, synchronized motor control signals are generated based on the video data that cause the one or more motors to be powered in synchronization with the energizing of the one or more LEDs. The LED array control signals are communicated to the LED array while the synchronized motor control signals are simultaneously communicated to the one or more motors causing the LED near-eye display element to display the XR experience to a user.

In some examples, the one or more motors sweep the LED array through a circular swept area, a sector of a circular swept area, or a rectangular swept area.

In some examples, the LED array of the LED near-eye display element is operably coupled to the one or more motors by a magnetic ring gear and one or more magnetic pinion gears.

In some examples, the LED array is powered by inductive coupling.

In some examples, the LED array is controlled via a wireless communication protocol.

Other technical features may be readily apparent to one skilled in the art from the following figures, descriptions, and claims.

Figure 1A:
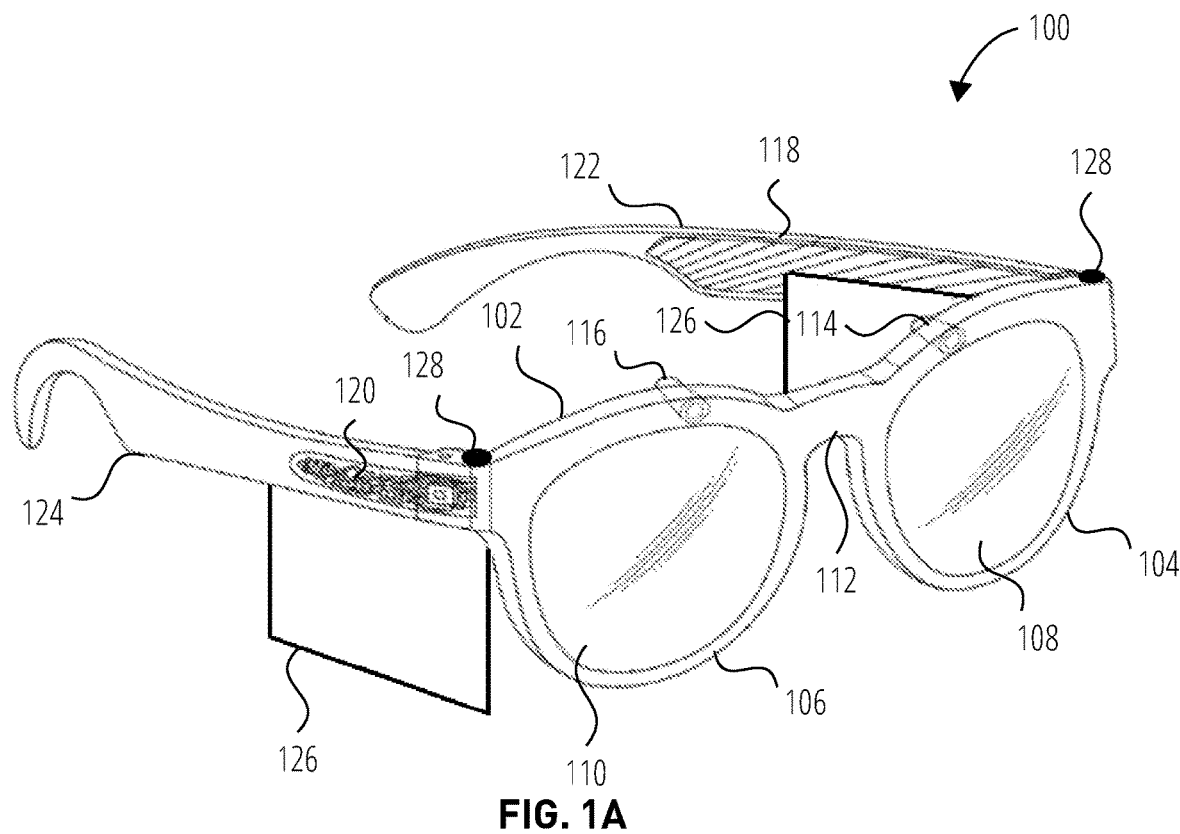
FIG. 1A is a perspective view of a head-worn device, in accordance with some examples.

FIG. 1A is a perspective view of a head-worn head worn XR system 100 in accordance with some examples. The head worn XR system 100 can include a frame 102 made from any suitable material such as plastic or metal, including any suitable shape memory alloy. In one or more examples, the frame 102 includes a first or first optical element holder 104 (e.g., a display or lens holder) and a second or second optical element holder 106 connected by a bridge 112. A left or first Light Emitting Diode (LED) near-eye display element 108 and a right or second LED near-eye display element 110 can be provided within respective first optical element holder 104 and second optical element holder 106.

The frame 102 additionally includes a left arm or left temple piece 122 and a right arm or right temple piece 124. In some examples the frame 102 can be formed from a single piece of material so as to have a unitary or integral construction.

The head worn XR system 100 can include a computing system, such as a computer 120, which can be of any suitable type so as to be carried by the frame 102 and, in one or more examples, of a suitable size and shape, so as to be partially disposed in one of the left temple piece 122 or the right temple piece 124. The computer 120 can include multiple processors, memory, and various communication components sharing a common power source. As discussed below, various components of the computer 120 may comprise low-power circuitry, high-speed circuitry, and a display processor. Various other examples may include these elements in different configurations or integrated together in different ways. Additional details of aspects of the computer 120 may be implemented as illustrated by the data processor 1002 discussed below.

The computer 120 additionally includes a battery 118 or other suitable portable power supply. In some examples, the battery 118 is disposed in left temple piece 122 and is electrically coupled to the computer 120 disposed in the right temple piece 124. The head worn XR system 100 can include a connector or port (not shown) suitable for charging the battery 118, a wireless receiver, transmitter or transceiver (not shown), or a combination of such devices.

The head worn XR system 100 include a first or left camera 114 and a second or right camera 116. Although two cameras are depicted, other examples contemplate the use of a single or additional (i.e., more than two) cameras. In one or more examples, the head worn XR system 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the head worn XR system 100 to extract 3D information from a real-world scene environment scene.

The head worn XR system 100 may also include a touchpad 126 mounted to or integrated with one or both of the left temple piece 122 and right temple piece 124. The touchpad 126 is generally vertically arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the first optical element holder 104 and second optical element holder 106. The one or more touchpads 126 and buttons 128 provide a means whereby the head worn XR system 100 can receive input from a user of the head worn XR systems 100.

Figure 1B:
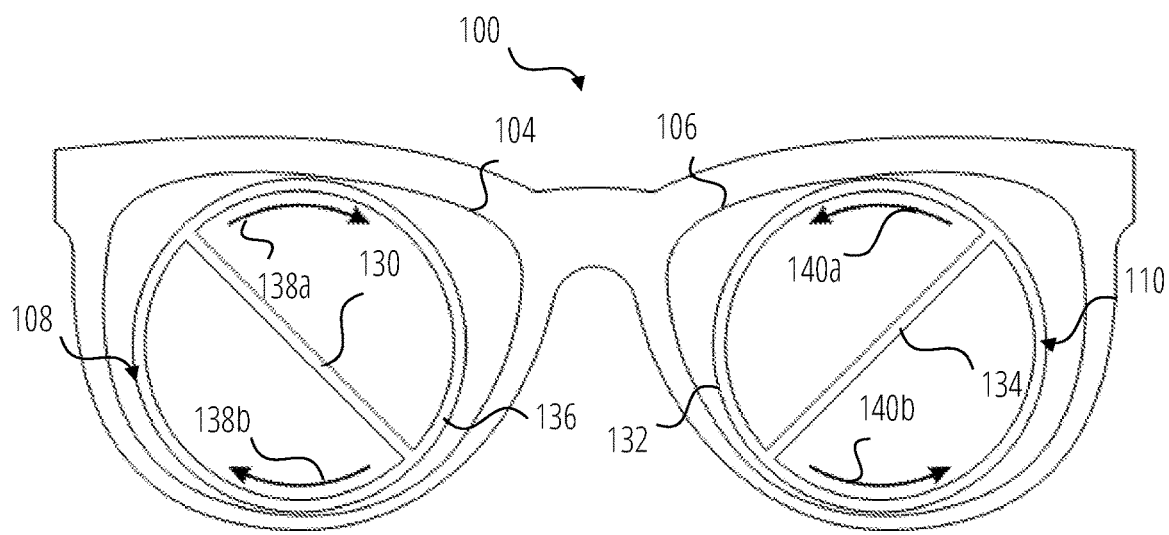
FIG. 1B illustrates a further view of the head-worn device of FIG. 1A, in accordance with some examples.

FIG. 1B illustrates the head worn XR system 100 from the perspective of a user. For clarity, a number of the elements shown in FIG. 1A have been omitted. As described in FIG. 1A, the head worn XR system 100 shown in FIG. 1B includes a first optical element holder 104 and a second optical element holder 106 holding a first LED near-eye display element 108 and a second LED near-eye display element 110 secured within, respectively.

The first LED near-eye display element 108 comprises a rotating rim 136 and an LED array 130 attached to the rotating rim 136 at a first distal portion of the LED array 130 and a second distal portion of the LED array 130. The LED array 130 spans an inner portion of the rotating rim 136. The rotating rim 136 is enclosed by the first LED near-eye display element 108 and revolved or rotated within the first LED near-eye display element 108 (as indicated by arrow 138a and arrow 138b) either directly or indirectly by one or more motors (not shown). In some examples, the rotating rim 136 is rotated in a counterclockwise direction by the one or more motors. In some examples, the rotating rim 136 is rotated in a clockwise direction by the one or more motors.

The second optical element holder 106 holds a second LED near-eye display element 110 comprising a rotating rim 132 and an LED array 134 attached to the rotating rim 132 at a first distal portion of the LED array 134 and a second distal portion of the LED array 134. The LED array 134 spans an inner portion of the rotating rim 132. The rotating rim 132 is enclosed by the second LED near-eye display element 110 and rotated within the second LED near-eye display element 110 (as indicated by arrow 140a and arrow 140b) either directly or indirectly by one or more motors (not shown). In some examples, the rotating rim 132 is rotated in a counterclockwise direction by the one or more motors. In some examples, the LED array 134 is rotated in a clockwise direction by the one or more motors.

In some examples, components of an LED near-eye display element comprise a transparent substrate upon which an LED array is mounted. In some examples, the transparent substrate is circular and an outer rim portion of the transparent substrate comprises a rotating rim. In some examples, the LED array is formed in the transparent substrate.

A combination of an LED display driver (not shown), the first LED near-eye display element 108, and the second LED near-eye display element 110 provide an XR display system that is a component of the head worn XR system 100. The head worn XR system 100 use the XR display system to generate an overlay of the real-world scene environment view of the user including display of a user interface to the user of the head worn XR system 100.

In use, a user of the head worn XR system 100 can be presented with information, content and various user interfaces on the LED near-eye display elements as described in more detail herein. The user can then interact with the head worn XR systems 100 using a touchpad 126 and/or the buttons 128, voice inputs or touch inputs on an associated device (e.g. mobile computing system 1026 illustrated in FIG. 10), and/or hand movements, locations, and positions detected by the head worn XR system 100.

In some examples, the head worn XR system 100 comprise a stand-alone XR system that provides an XR experience to a user of the head worn XR system 100. In some examples, the head worn XR system 100 are a component of an XR system that includes one or more other devices providing additional computational resources and or additional user input and output resources. The other devices may comprise a smartphone, a general purpose computer, or the like.

Figure 2A:
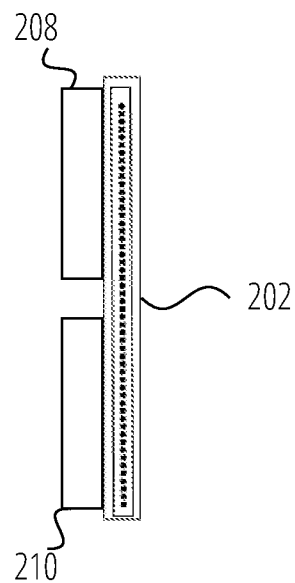
FIG. 2A is an illustration of an LED array, in accordance with some examples.

FIG. 2A is an illustration of an LED array, in accordance with some examples. An LED array 202 can be utilized as LED array 130 or LED array 134 of FIG. 1B. The LED array 202 comprises one or more LEDs arranged in a linear pattern along a long axis of the LED array 202. In some examples, the one or more LEDs are grouped in sets of red, green, and blue individual LEDs. In some examples, the one or more LEDs are Red Green Blue (RGB) LEDs. The one or more LEDs are controlled by an LED array control signal receiver 208 including LED array control logic operable to control a sequence of energizing the one or more LEDs of the LED array 202. In some examples, the LED array 202 and LED array control signal receiver 208 and the LED array control logic are powered by an LED array power receiver circuit 210 that is inductively coupled to a power source of an XR system.

Figure 2B:
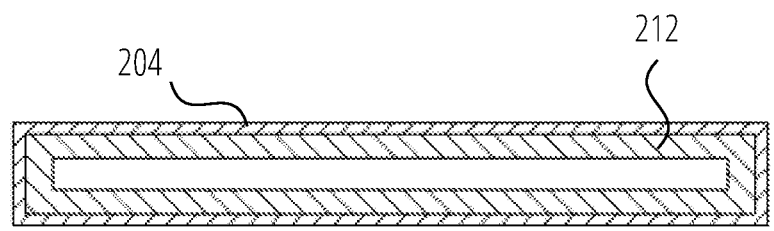
FIG. 2B and FIG. 2C are top views of optical element holders holding LED near-eye display elements, in accordance with some examples.
Figure 2C:
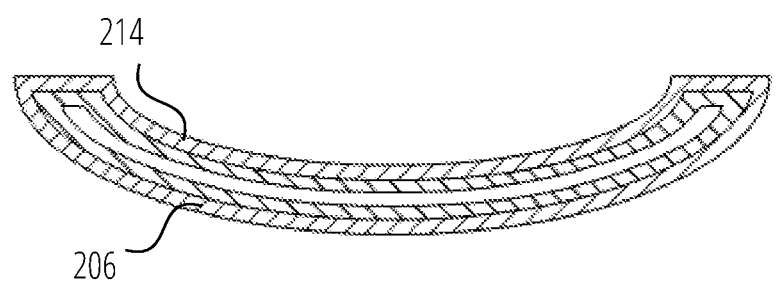

FIG. 2B and FIG. 2C are top views of optical element holders holding LED near-eye display elements, in accordance with some examples. As illustrated in FIG. 2B, a flat optical element holder 204 may hold a flat LED near-eye display element 212. As illustrated in FIG. 2C, a curved optical element holder 206 may hold a curved LED near-eye display element 214. In some examples, an LED near-eye display element may comprise one or more vision corrective components used to correct the vision of a user.

Figure 3:
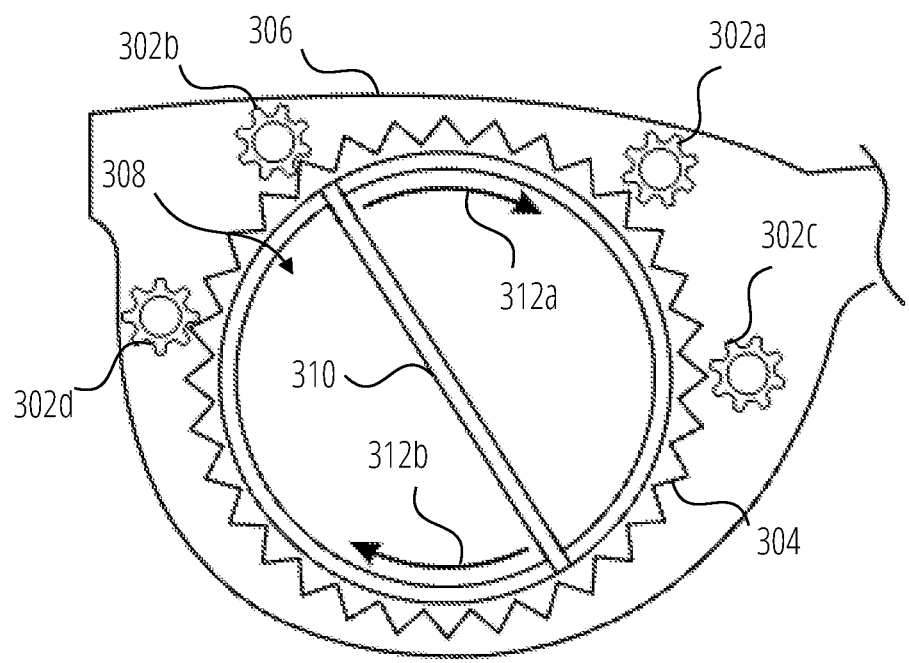
FIG. 3 is a diagram of an optical element holder and a corresponding LED near-eye display element, in accordance with some examples.

FIG. 3 is a diagram of an optical element holder and a corresponding LED near-eye display element, in accordance with some examples.

The optical element holder 306 holds an LED near-eye display element 308 having a rotating rim comprising a magnetic ring gear 304 and an LED array 310 attached to the magnetic ring gear 304 at a first distal portion of the LED array 310 and a second distal portion of the LED array 310. The LED array 310 spans an inner portion of the magnetic ring gear 304. The magnetic ring gear 304 is enclosed by the LED near-eye display element 308 and revolved or rotated within the LED near-eye display element 308 (as indicated by arrow 312a and arrow 312b) by one or more magnetic pinion gears, such as magnetic pinion gear 302a, magnetic pinion gear 302b, magnetic pinion gear 302c, and magnetic pinion gear 302d. The magnetic pinion gears are driven by one or more motors (not shown). In some examples, the magnetic ring gear 304 is rotated in a counterclockwise direction by the one or more magnetic pinion gears. In some examples, the magnetic ring gear 304 is rotated in a clockwise direction by the one or more magnetic pinion gears.

In some examples, a non-magnetic ring gear is used. In some examples, non-magnetic pinion gears are used.

In some examples, the optical element holder 306 holds an LED near-eye display element having a rotating rim and an LED array attached to the rotating rim at a first distal portion of the LED array and a second distal portion of the LED array. The LED array spans an inner portion of the rotating rim. The rotating rim is enclosed by the LED near-eye display element and rotated within the LED near-eye display element by one or more powered rollers. The powered rollers are driven by one or more motors.

Figure 4A:
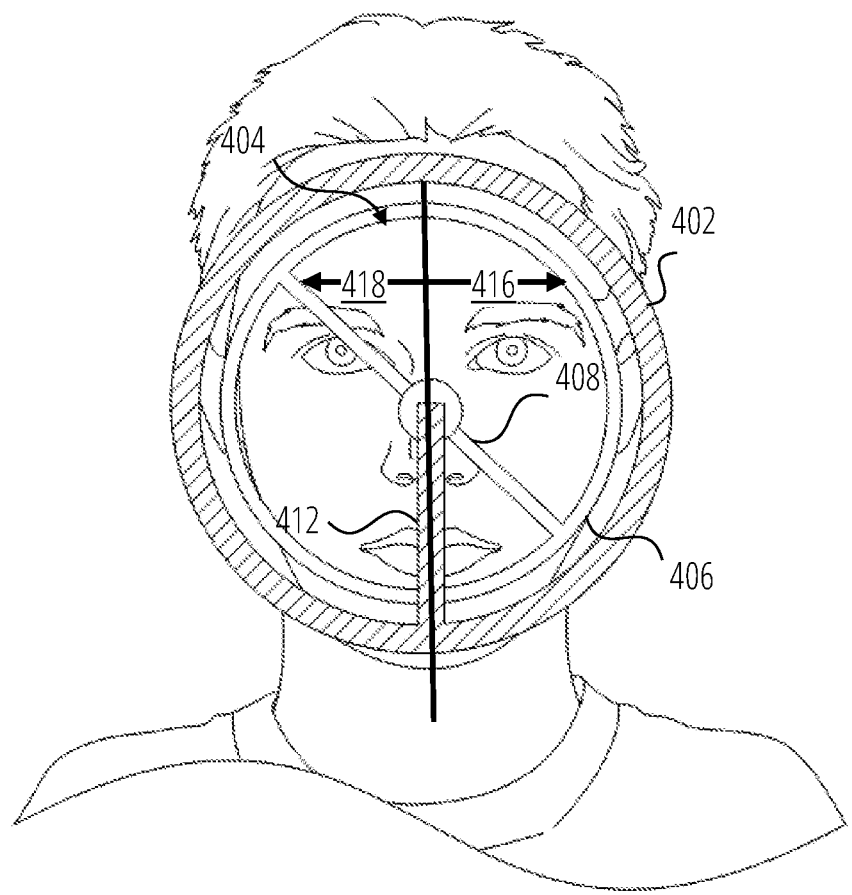
FIG. 4A illustrates a front view of an alternative LED near-eye display element and FIG. 4B illustrates a top view of the alternative LED near-eye display element, in accordance with some examples.
Figure 4B:
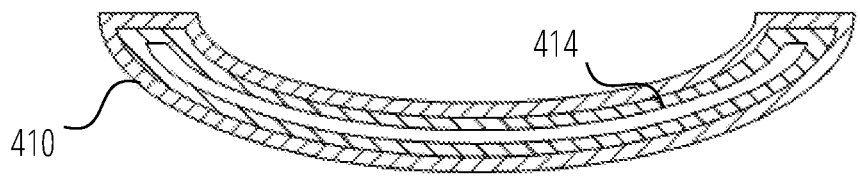

FIG. 4A illustrates a front view of an alternative LED near-eye display element and FIG. 4B illustrates a top view of the alternative LED near-eye display element, in accordance with some examples. The alternative LED near-eye display element 404 spans a user's face covering the left eye and the right eye of the user with a single LED near-eye display element having one or more LED arrays.

An optical element holder 402 holds an LED near-eye display element 404 comprising a rotating rim 406 and an LED array 408 attached to the rotating rim 406 at a first distal portion of the LED array 408 and a second distal portion of the LED array 408. The LED array 408 spans an inner portion of the rotating rim 406. The rotating rim 406 is enclosed by the LED near-eye display element 404 and revolved or rotated within the LED near-eye display element 404. In some examples, the rotating rim 406 is rotated in a counterclockwise direction by the one or more motors. In some examples, the rotating rim 406 is rotated in a clockwise direction by the one or more motors.

Rotation of the LED array 408 causes the LED array 408 to sweep through a circular swept area. The circular swept area includes a left viewing sector 416 visible to a left eye of a user and a right viewing sector 418 visible to a right eye of a user.

In some examples, components of an LED near-eye display element comprise a transparent substrate upon which one or more LED arrays and rotating rim are mounted. In some examples, the transparent substrate is circular and an outer rim portion of the transparent substrate comprises the rotating rim. In some examples, the one or more LED arrays are formed in the transparent substrate.

In some examples, the optical element holder 402 comprises a central mounting post 412 extending from a rim portion of the optical element holder 402 to a central portion of the optical element holder 402. One or more motors are mounted on the central mounting post 412 and used to rotate the LED array 408.

As illustrated in FIG. 4B, a curved optical element holder 410 may hold a curved LED near-eye display element 414. In some examples, an LED near-eye display element may comprise one or more vision corrective components used to correct the vision of a user.

Figure 5:
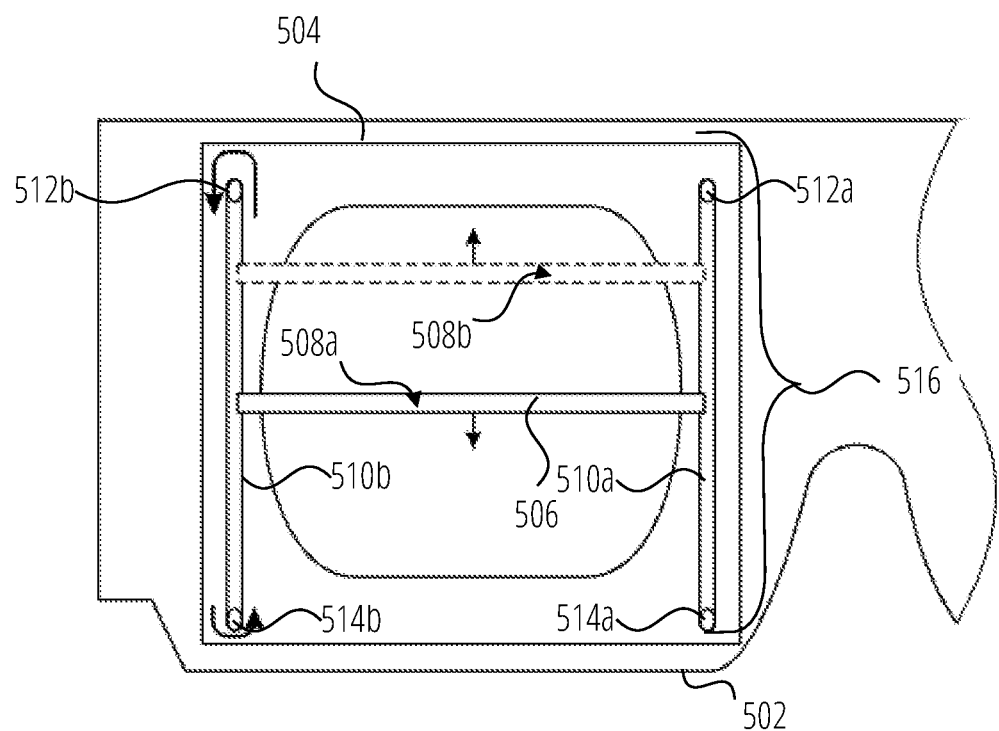
FIG. 5 is a diagram of another optical element holder and a corresponding LED near-eye display element, in accordance with some examples.

FIG. 5 is a diagram of another optical element holder and a corresponding LED near-eye display element, in accordance with some examples. An optical element holder 502 holds an LED near-eye display element 504. The LED near-eye display element 504 comprises an LED array 506 attached to one or more traction belts, such as traction belt 510a and traction belt 510b. The LED array 506 is attached to a first traction belt, such as traction belt 510a at a first distal portion and a second traction belt, such as traction belt 510b, at a second distal portion. A traction belt is operatively attached to one or more powered rollers, such as powered roller 512a or powered roller 512b, and optionally to one or more unpowered rollers, such as unpowered roller 514a or unpowered roller 514b. The traction belts are operable to transport the LED array 506 back and forth between positions, such as LED array position 508a and LED array position 508b creating a rectangular swept area 516 in which an image may be formed by selectively energizing one or more LEDs of the LED array 506.

In some examples, a rotational direction of the powered roller 512a and powered roller roller 512b is switched to change a direction of movement of the traction belt 510a and traction belt 510b to position the LED array 506 in a specified position.

In some examples, the LED array 506 is pinned to the traction belt 510a and the traction belt 510b by rotatable connections. The powered roller 512a and the powered roller roller 512b are driven in a single rotational direction. The rotatable connections allow the traction belts 510a and 510*b* to travel around the rollers 512*a*, 512*b*, 514*a*, 514*b* while the distal portions of the LED array 506 are attached.

In some examples, two or more LED arrays are attached to the one or more traction belts.

Figure 6:
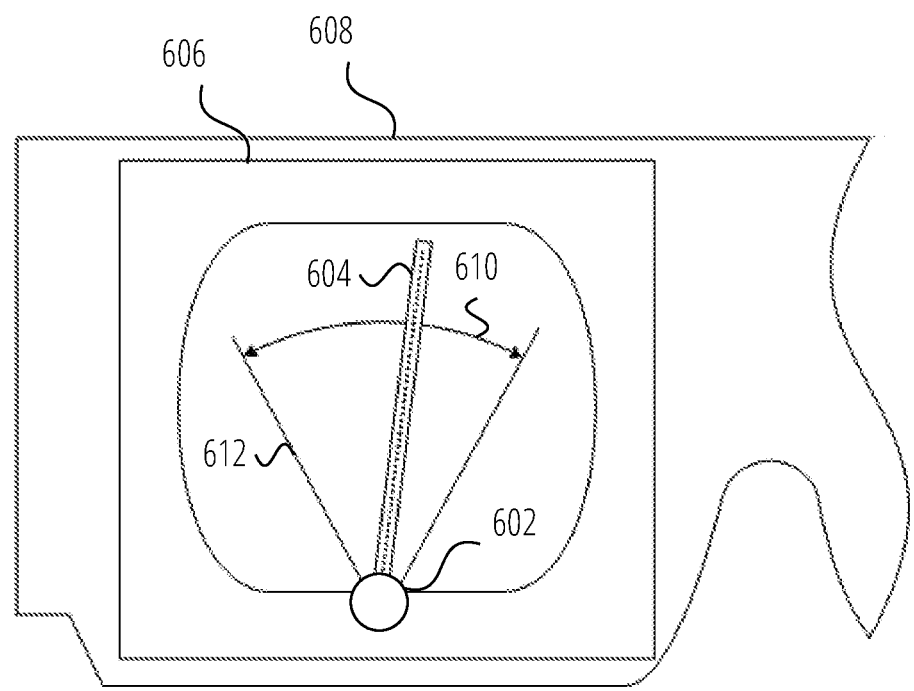
FIG. 6 is an illustration of another optical element holder and corresponding LED near-eye display element, in accordance with some examples.

FIG. 6 is an illustration of another optical element holder and corresponding LED near-eye display element, in accordance with some examples. An optical element holder 608 holds an LED near-eye display element 606. The LED near-eye display element 606 comprises an LED near-eye display element 606 having a first distal portion attached to a motor 602 leaving a second distal portion of the LED array 604 free. The motor 602 is operable to oscillate the LED array 604 back and forth, as indicated by arc 610, sweeping the LED array through a sector 612 of a circular swept area.

Figure 7A:
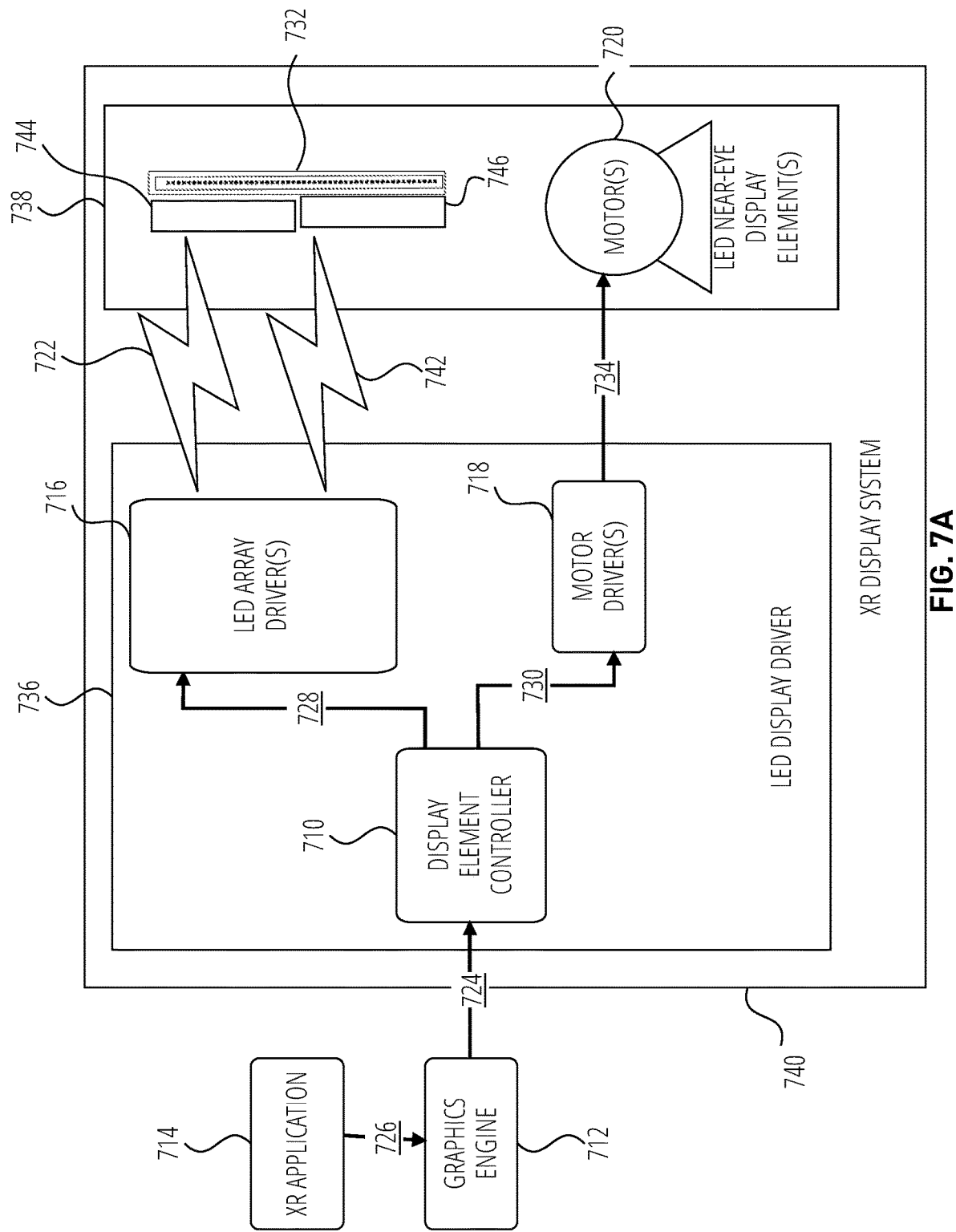
FIG. 7A is an architecture diagram of an XR display system.
Figure 7B:
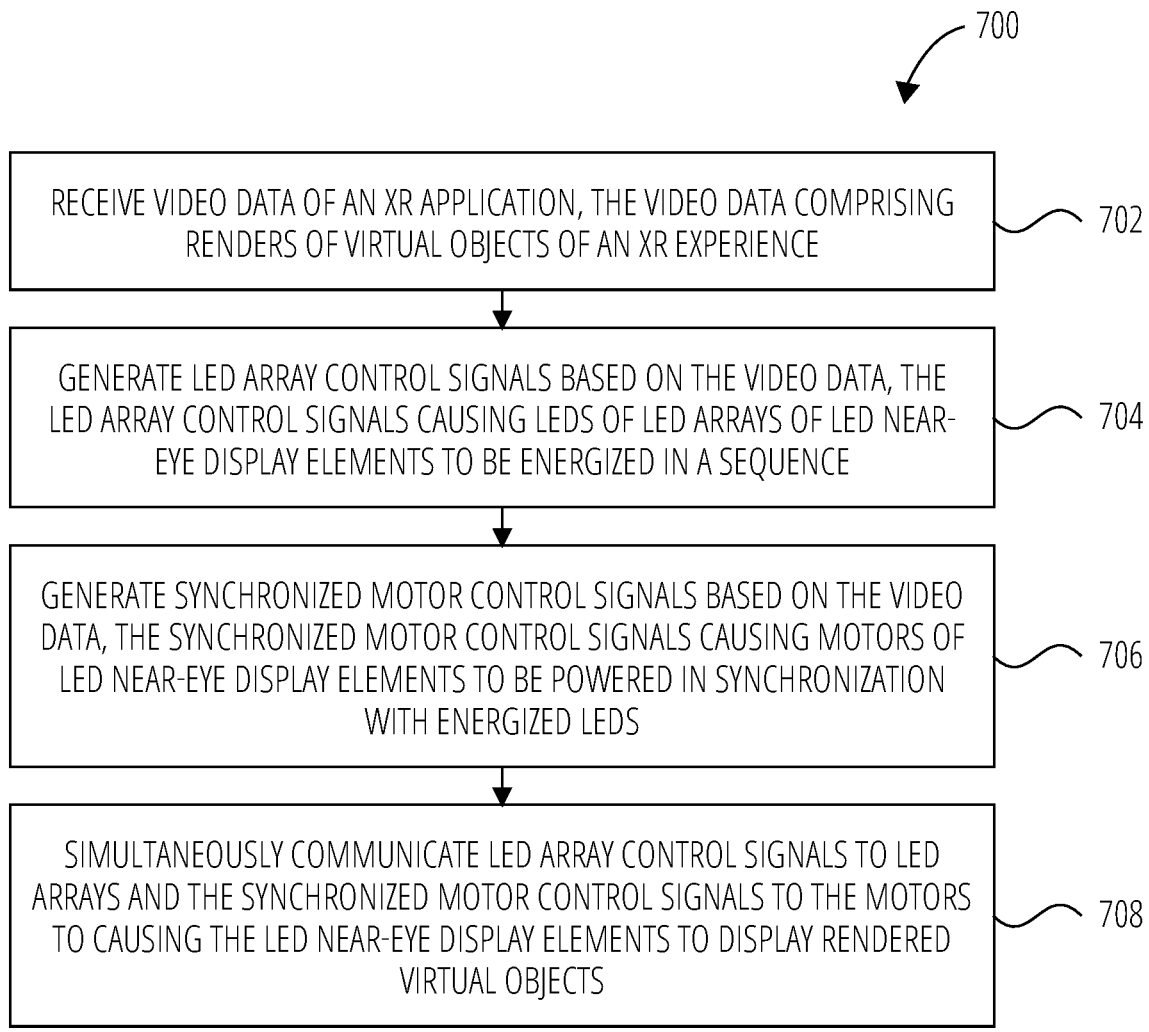
FIG. 7B illustrates an example XR display system method, in accordance with some examples.

FIG. 7A is an architecture diagram of an XR display system, and FIG. 7B illustrates an example XR display system method, in accordance with some examples. Although the example XR display system method 700 depicts a particular sequence of operations, the sequence may be altered without departing from the scope of the present disclosure. For example, some of the operations depicted may be performed in parallel or in a different sequence that does not materially affect the function of the XR display system method 700. In other examples, different components of an example device or system that implements the XR display system method 700 may perform functions at substantially the same time or in a specific sequence.

In operation 702, an LED display driver 736 of the XR display system 740, receives video data 724 of an XR experience generated by an XR application 714 of an XR system. The video data 724 comprises renders of one or more virtual objects of an XR experience provided by the XR application 714. For example, the XR application 714 generates virtual object data 726 of the XR experience being provided to a user of the XR system. The virtual object data 726 includes data of one or more virtual objects such as, but not limited to, 3D geometric data of the size, shape, and location of the one or more virtual objects virtually located in a real-world scene of the XR experience. The virtual object data 726 also includes graphics information such as colors, shadings, and textures of the one or more virtual objects. The XR application 714 communicates the virtual object data 726 to a graphics engine 712 of the XR system.

A graphics engine 712 receives the virtual object data 726 and generates video data 724 based on the virtual object data 726. The video data 724 includes 3D renders of the one or more virtual objects of the XR experience as they are to appear in the real-world scene from the viewpoint of the user of the XR system. The graphics engine 712 communicates the video data 724 to a display element controller 710 of the LED display driver 736 of the XR display system 740.

In operation 704, the LED display driver 736 generates LED array control signals 722 based on the video data 724. The LED array control signals 722 cause one or more LEDs of one or more LED arrays 732 of one or more LED near-eye display elements 738 to be energized in a sequence. For example, the display element controller 710 of the LED display driver 736 generates LED sequence instructions 728 based on the video data 724. The LED sequence instructions 728 include information on how to sequentially energize one or more LEDs of the one or more LED arrays 732 as the one or more LED arrays 732 are being moved in front of a user's eyes by one or more motors 720 of the one or more LED near-eye display elements 738. When movement of the one or more LEDs is properly synchronized with the sequential energization of the one or more LEDs, and image is formed that is viewable by the user.

In some examples, a motor of an LED near-eye display element rotates an LED array of the LED near-eye display element about a central axis of the LED array and a specified rotational speed. An LED of the LED array has a known distance from the center of rotation of the LED array. As the LED array is revolved or rotated at the specified rotational speed, a circular swept area swept by the LED array during a revolution can be represented as having individual pixels corresponding to individual LEDs of the LED array. A position of a pixel within the circular swept area can be expressed in a polar coordinate system as an angle of the rotation of the LED array and a distance of the pixel from the center of rotation of the LED array in the polar coordinate system. The video data generated by a graphics engine includes video frame data comprising pixel data of individual pixels comprising X and Y coordinates in a Cartesian coordinate system. The display element controller 710 maps a pixel having Cartesian coordinates in the video frame data of the video data 724 to a pixel having polar coordinates in the circular swept area of the LED near-eye display element. The display element controller includes the polar coordinates of mapped pixels in the LED sequence instructions 728 that is communicated to other components of an XR display system.

In some examples, a motor rotates an LED array through an arc creating a swept area that is a sector of a circular swept area.

In some examples, a linear LED array is moved back and forth in a linear motion having a direction of motion that is orthogonal to a linear axis of the LED array. Accordingly, the LED array sweeps a rectangular swept area. The display element controller 710 maps pixels having Cartesian coordinates in the video frame data of the video data 724 into Cartesian coordinates of the rectangular swept area of the linear LED array.

The display element controller 710 communicates the LED sequence instructions 728 to one or more LED array drivers 716. The one or more LED array drivers 716 receive the LED sequence instructions 728 and generate LED array control signals 722 based on the LED sequence instructions 728.

In operation 706, the LED display driver 736 generates synchronized motor control signals 734 based on the video data. The synchronized motor control signals 734 cause one or more motors 720 of the one or more LED near-eye display elements 738 to be powered in synchronization with the one or more LED arrays 732. For example, the display element controller 710 generates synchronized motor control instructions 730 synchronized with the LED sequence instructions 728 based on the video data 724. For example, in a case one or more motors of an LED near-eye display element rotate the LED array through 360 degrees and the video data 724 includes video frame data at 30 frames per second (fps), the LED sequence instructions 728 includes 30 frames of data that are displayed in one second where a frame is displayed during a full rotation of the LED array. Therefore, the synchronized motor control instructions 730 include instructions instructing one or more motor drivers 718 to operate one or more respective motors to rotate the LED array at 30 rotations per second or 1800 Revolutions Per Minute (RPM). The display element controller 710 communicates the synchronized motor control instructions 730 to one or more motor drivers 718. The one or more motor drivers 718 receive the synchronized motor control instructions 730 and generate synchronized motor control signals 734 based on the synchronized motor control instructions 730.

In operation 708, the LED display driver 736 simultaneously communicates the LED array control signals 722 to the one or more LED arrays LED array 732 and the synchronized motor control signals to the one or more motors motor 720 causing the one or more LED near-eye display element 738 to display the rendered virtual objects to the user of the XR system. For example, the one or more LED array drivers 716 of the LED display driver 736 communicate the LED array control signals 722 to one or more LED array control signal receivers 744 connected to the one or more respective LED arrays 732. The one or more LED array control signal receivers 744 include LED array control logic that control energizing one or more LEDs of the one or more respective LED arrays 732 based on the LED array control signals 722. In addition, the one or more motor drivers 718 communicate the synchronized motor control signals 734 to the one or more motors 720 of the one or more LED near-eye display elements 738. The one or more motors 720 move the one or more LED arrays 732 as the one or more LED array control signal receivers 744 energize respective LED arrays 732 connected to the one or more respective motors 720 to display the rendered virtual objects of the XR experience to the user of the XR system.

In some examples, an XR display system includes a left (first) LED near-eye display element and a right (second) LED near-eye display element. The graphics engine 712 generates binocular video data comprising left view video data of one or more virtual objects as viewed by a left eye of the user of the XR system and right view video data of the one or more virtual objects as viewed by a right eye of the user of the XR system. An LED display driver receives the binocular video data and generates left (first) LED array control signals based on the left view video data that cause left (first) one or more LEDs of a left (first) LED array of a left (first) LED near-eye display element to be energized in a left (first) sequence. The LED display driver also generates right (second) LED array control signals based on the right view video data that cause a right (second) one or more LEDs of a right (second) LED array of a right (second) LED near-eye display element to be energized in a right (second) sequence. The LED display driver generates left (first) synchronized motor control signals based on the left view video data that cause left (first) one or more motors of the left (first) LED near-eye display element to be powered in synchronization with the energizing of the left (first) one or more LEDs. The LED display driver also generates right (second) synchronized motor control signals based on the right view video data that cause right (second) one or more motors of the right (second) LED near-eye display element to be powered in synchronization with the energizing of the right (second)) one or more LEDs. The LED driver simultaneously communicates the left (first) LED array control signals and the right (second) LED array control signals to the left (first) one or more LED arrays and the right (second) one or more LED arrays, respectively. The LED display driver also simultaneously communicates the left (first) synchronized motor control signals to the left (first) one or more motors and the right (second) synchronized motor control signals to the right (second) one or more motors, respectively. The simultaneous communication of the left (first) and right (second) LED array control signals and the left (first) and right (second) synchronized motor control signals cause the left (first) LED near-eye display element and right (second) LED near-eye display element to generate a display provided to a user of an XR system.

In some examples, an XR display system includes an LED near-eye display element that spans across the left and right eyes of a user. The LED near-eye display element includes a left (first) viewing sector and right (second) viewing sector of a circular swept area of an LED array of the LED near-eye display element. The graphics engine 712 generates binocular video data comprising left view video data of one or more virtual objects of an XR experience as viewed by a left eye of the user of the XR system and right view video data of the one or more virtual objects as viewed by a right eye of the user of the XR system. An LED display driver receives the binocular video data and generates left (first) LED array control signals based on the left view video data that cause one or more LEDs of the LED array to be energized in a left (first) sequence when the one or more LEDs are located in the left (first) viewing sector of the circular swept area. The LED display driver also generates right (second) LED array control signals based on the right view video data that cause the one or more LEDs of the LED array to be energized when the one or more LEDs are located in the right (second) viewing sector. The LED display driver generates synchronized motor control signals based on the binocular video data that cause one or more motors of the LED near-eye display element to be powered in synchronization with the energizing of the one or more LEDs. The LED display driver communicates the left (first) LED array control signals to the one or more LEDs when the one or more LEDs are located in the left (first) viewing sector and communicates the right (second) LED array control signals to the one or more LEDs when the one or more LEDs are located in the right (second) viewing sector. The LED display driver also simultaneously communicates the synchronized motor control signals to the one or more motors. The simultaneous communication of the left (first) and right (second) LED array control signals and the synchronized motor control signals cause the LED near-eye display element to generate a display provided to a user of an XR system.

In some examples, the one or more LED array drivers 716 generate magnetic fields 742 that power the one or more LED array control signal receivers 744 and the one or more LED arrays 732 by inductively coupling to one or more LED array power receiver circuits 746.

In some examples, the one or more LED array control signal receivers 744 and the one or more LED arrays 732 are powered through an electromechanical coupling such as slip rings or the like.

In some examples, the one or more LED array drivers 716 communicate the LED array control signals 722 to the one or more LED array control signal receivers 744 using a wireless communication protocol such as, but not limited to, Bluetooth.

In some examples, the one or more LED array drivers 716 communicate the LED array control signals 722 to the one or more LED array control signal receivers 744 via an electromechanical coupling such as slip rings or the like.

Figure 8:
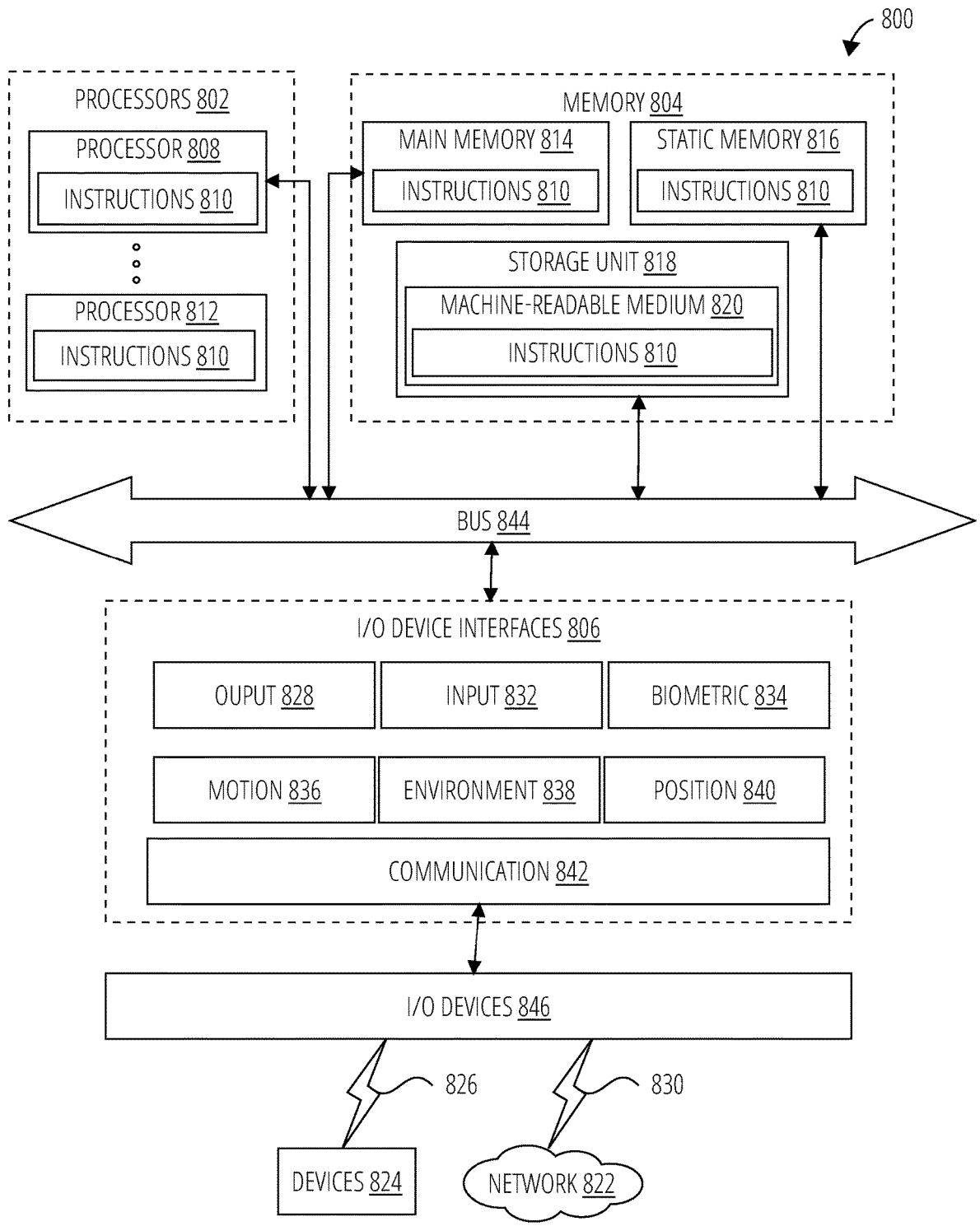
FIG. 8 is a diagrammatic representation of a machine within which a set of instructions may be executed for causing the machine to perform any one or more of the methodologies discussed herein in accordance with some examples.

FIG. 8 is a diagrammatic representation of a machine 800 within which instructions 810 (e.g., software, a program, an application, an applet, an app, or other executable code) for causing the machine 800 to perform any one or more of the methodologies discussed herein may be executed. The machine 800 may be utilized as a computer 120 of an AR system such as head worn XR system 100 of FIG. 1A. For example, the instructions 810 may cause the machine 800 to execute any one or more of the methods or processes described herein. The instructions 810 transform the general, non-programmed machine 800 into a particular machine 800 programmed to carry out the described and illustrated functions in the manner described. The machine 800 may operate as a standalone device or may be coupled (e.g., networked)

to other machines. In a networked deployment, the machine 800 may operate in the capacity of a server machine or a client machine in a server-client network environment, or as a peer machine in a peer-to-peer (or distributed) network environment. The machine 800 in conjunction with other components of the AR system may function as, but not limited to, a server, a client, computer, a personal computer (PC), a tablet computer, a laptop computer, a netbook, a set-top box (STB), a PDA, an entertainment media system, a cellular telephone, a smartphone, a mobile device, a head-worn device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while a single machine 800 is illustrated, the term "machine" may also be taken to include a collection of machines that individually or jointly execute the instructions 810 to perform any one or more of the methodologies discussed herein.

The machine 800 may include processors 802, memory 804, and I/O device interfaces 806, which may be configured to communicate with one another via a bus 844. In an example, the processors 802 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 802, the machine 800 may include a single processor with a single core, a single processor with multiple cores (e.g., a multi-core processor), multiple processors with a single core, multiple processors with multiples cores, or any combination thereof.

The memory 804 includes a main memory 814, a static memory 816, and a storage unit 818, both accessible to the processors 802 via the bus 844. The main memory 804, the static memory 816, and storage unit 818 store the instructions 810 embodying any one or more of the methodologies or functions described herein. The instructions 810 may also reside, completely or partially, within the main memory 814, within the static memory 816, within a non-transitory machine-readable medium 820 within the storage unit 818, within one or more of the processors 802 (e.g., within the processor's cache memory), or any suitable combination thereof, during execution thereof by the machine 800.

The I/O device interfaces 806 couple the machine 800 to I/O devices 846. One or more of the I/O devices 846 may be a component of machine 800 or may be separate devices. The I/O device interfaces 806 may include a wide variety of interfaces to the I/O devices 846 used by the machine 800 to receive input, provide output, produce output, transmit information, exchange information, capture measurements, and so on. The specific I/O device interfaces 806 that are included in a particular machine will depend on the type of machine. It will be appreciated that the I/O device interfaces 806 the I/O devices 846 may include many other components that are not shown in FIG. 8. In various examples, the I/O device interfaces 806 may include output component interfaces 828 and input component interfaces 832. The output component interfaces 828 may include interfaces to visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input component interfaces 832 may include interfaces to alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O device interfaces 806 may include biometric component interfaces 834, motion component interfaces 836, environmental component interfaces 838, or position component interfaces 840, among a wide array of other component interfaces. For example, the biometric component interfaces 834 may include interfaces to components used to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion component interfaces 836 may include interfaces to inertial measurement units (IMUs), acceleration sensor components (e.g., accelerometer), gravitation sensor components, rotation sensor components (e.g., gyroscope), and so forth. The environmental component interfaces 838 may include, for example, interfaces to illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding real-world scene. The position component interfaces 840 include interfaces to location sensor components (e.g., a Global Positioning System (GPS) receiver component and/or an Inertial Measurement Unit (IMU)), altitude sensor components (e.g., altimeters or barometers that detect air pressure from which altitude may be derived), orientation sensor components (e.g., magnetometers), and the like.

Communication may be implemented using a wide variety of technologies. The I/O device interfaces 806 further include communication component interfaces 842 operable to couple the machine 800 to a network 822 or devices 824 via a coupling 830 and a coupling 826, respectively. For example, the communication component interfaces 842 may include an interface to a network interface component or another suitable device to interface with the network 822. In further examples, the communication component interfaces 842 may include interfaces to wired communication components, wireless communication components, cellular communication components, Near Field Communication (NFC) components, Bluetooth© components (e.g., Bluetooth© Low Energy), Wi-Fi© components, and other communication components to provide communication via other modalities. The devices 824 may be another machine or any of a wide variety of peripheral devices (e.g., a peripheral device coupled via a USB).

Moreover, the communication component interfaces 842 may include interfaces to components operable to detect identifiers. For example, the communication component interfaces 842 may include interfaces to Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication component interfaces 842, such as location via Internet Protocol (IP) geolocation, location via Wi-Fi® signal triangulation, location via detecting an NFC beacon signal that may indicate a particular location, and so forth.

The various memories (e.g., memory 804, main memory 814, static memory 816, and/or memory of the processors 802) and/or storage unit 818 may store one or more sets of instructions and data structures (e.g., software) embodying or used by any one or more of the methodologies or functions described herein. These instructions (e.g., the instructions 810), when executed by processors 802, cause various operations to implement the disclosed examples.

The instructions 810 may be transmitted or received over the network 822, using a transmission medium, via a network interface device (e.g., a network interface component included in the communication component interfaces 842) and using any one of a number of well-known transfer protocols (e.g., hypertext transfer protocol (HTTP)). Similarly, the instructions 810 may be transmitted or received using a transmission medium via the coupling 826 (e.g., a peer-to-peer coupling) to the devices 824.

Figure 9:
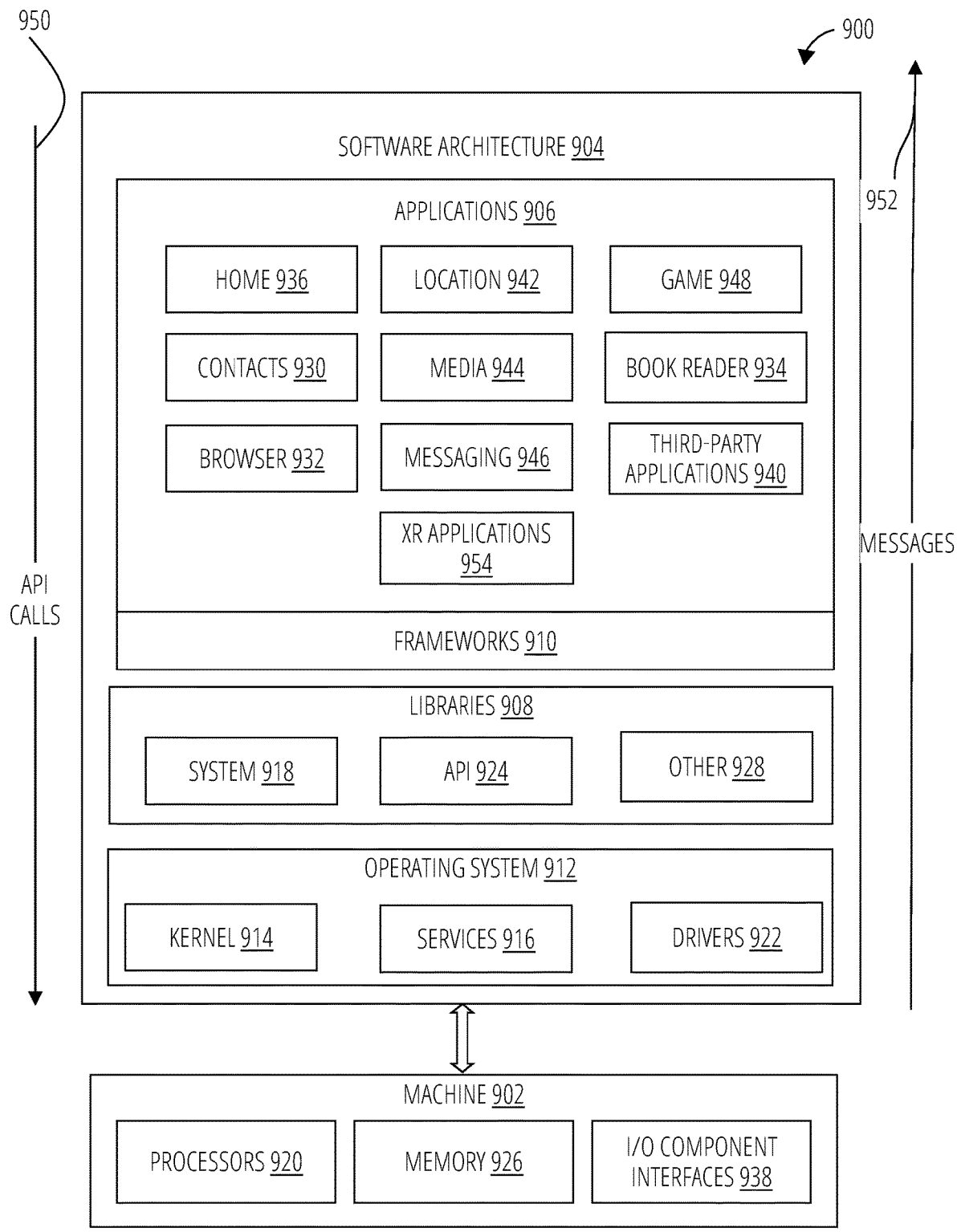
FIG. 9 is a block diagram showing a software architecture within which the present disclosure may be implemented, in accordance with some examples.

FIG. 9 is an architecture diagram 900 illustrating a software architecture 904, which can be installed on any one or more of the devices described herein. The software architecture 904 is supported by hardware such as a machine 902 that includes processors 920, memory 926, and I/O component interfaces 938. In this example, the software architecture 904 can be conceptualized as a stack of layers, where individual layers provide a particular functionality. The software architecture 904 includes layers such as an operating system 912, libraries 908, frameworks 910, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionalities. The services 916 can provide other common services for the other software layers. The drivers 922 are responsible for controlling or interfacing with the underlying hardware. For instance, the drivers 922 can include LED display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 908 provide a low-level common infrastructure used by the applications 906. The libraries 908 can include system libraries 918 (e.g., C standard library) that provide functions such as memory allocation functions, string manipulation functions, mathematic functions, and the like. In addition, the libraries 908 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g. OpenIMAJ), database libraries (e.g., SQLite to provide various relational database functions), web libraries (e.g., WebKit to provide web browsing functionality), and the like. The libraries 908 can also include a wide variety of other libraries 928 to provide many other APIs to the applications 906.

The frameworks 910 provide a high-level common infrastructure that is used by the applications 906. For example, the frameworks 910 provide various graphical user interface (GUI) functions, high-level resource management, and high-level location services. The frameworks 910 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as third-party applications 940 and XR applications 954. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party applications 940 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 940 can invoke the API calls 950 provided by the operating system 912 to facilitate functionality described herein.

Figure 10:
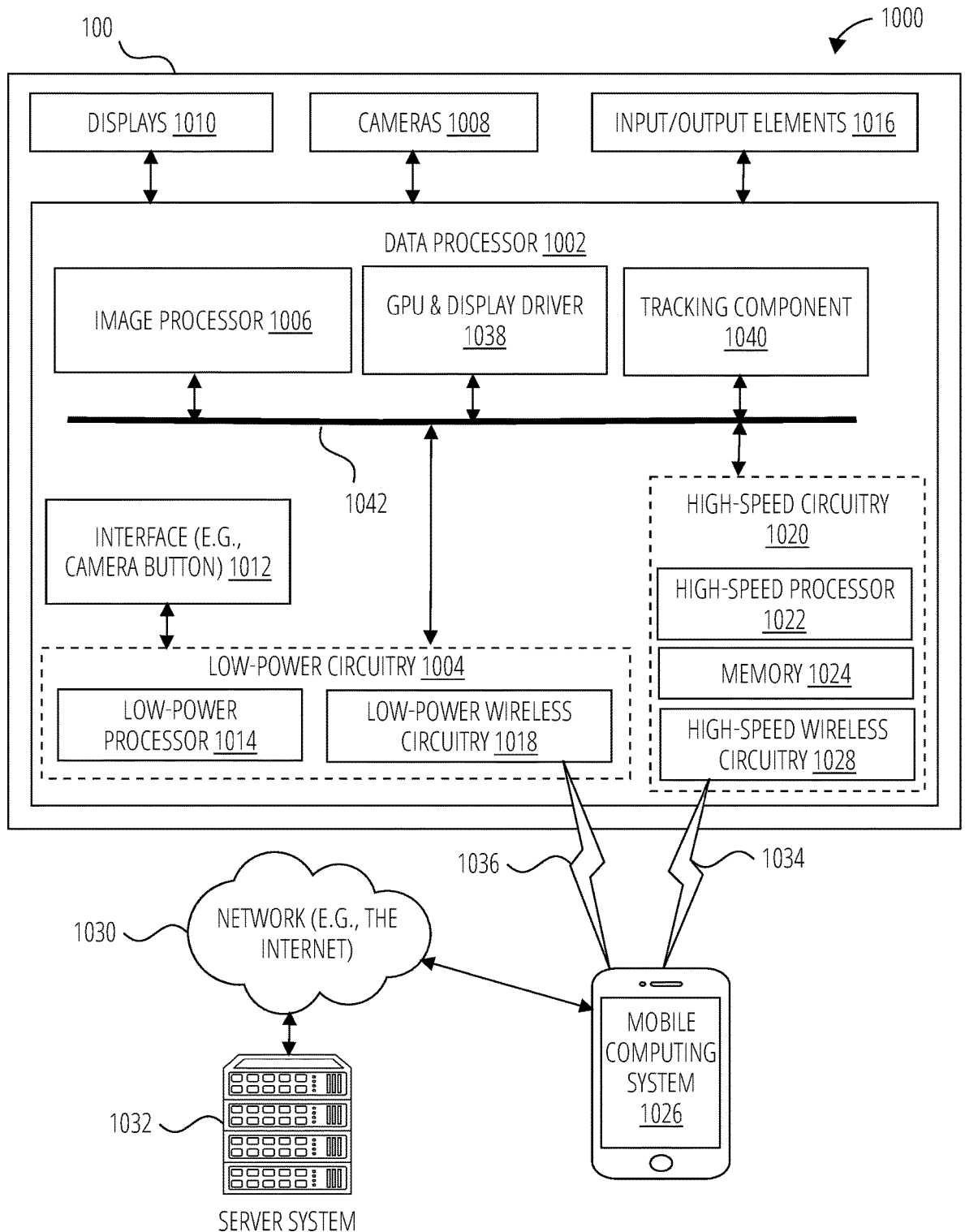
FIG. 10 is a block diagram illustrating a networked system including details of a head-worn XR system, in accordance with some examples.

FIG. 10 is a block diagram illustrating a networked system 1000 including details of the head worn XR system 100, in accordance with some examples. The networked system 1000 includes the head worn XR system 100, a mobile computing system 1026, and a server system 1032. The mobile computing system 1026 may be a smartphone, tablet, phablet, laptop computer, access point, or any other such device capable of connecting with the head worn XR system 100 using a low-power wireless connection 1036 and/or a high-speed wireless connection 1034. The mobile computing system 1026 is connected to the server system 1032 via the network 1030. The network 1030 may include any combination of wired and wireless connections. The server system 1032 may be one or more computing devices as part of a service or network computing system. The mobile computing system 1026 and any elements of the server system 1032 and network 1030 may be implemented using details of the software architecture 904 or the machine 800 described in FIG. 9 and FIG. 8 respectively.

The head worn XR system 100 include a data processor 1002, displays 1010, one or more cameras 1008, and additional input/output elements 1016. The input/output elements 1016 may include microphones, audio speakers, biometric sensors, additional sensors, or additional display elements integrated with the data processor 1002. Examples of the input/output elements 1016 are discussed further with respect to FIG. 9 and FIG. 8. For example, the input/output elements 1016 may include any of I/O device interfaces 806 including output component interfaces 828, motion component interfaces 836, and so forth. Examples of the displays 1010 are discussed in FIG. 1B. In the particular examples described herein, the displays 1010 include a display for the user's left and right eyes.

The data processor 1002 includes an image processor 1006 (e.g., a video processor), a GPU & display driver 1038, a tracking component 1040, an interface 1012, low-power circuitry 1004, and high-speed circuitry 1020. The components of the data processor 1002 are interconnected by a bus 1042.

The interface 1012 refers to any source of a user command that is provided to the data processor 1002. In one or more examples, the interface 1012 is a physical button that, when depressed, sends a user input signal from the interface 1012 to a low-power processor 1014. A depression of such button followed by an immediate release may be processed by the low-power processor 1014 as a request to capture a single image, or vice versa. A depression of such a button for a first period of time may be processed by the low-power processor 1014 as a request to capture video data while the button is depressed, and to cease video capture when the button is released, with the video captured while the button was depressed stored as a single video file. Alternatively, depression of a button for an extended period of time may capture a still image. In some examples, the interface 1012 may be any mechanical switch or physical interface capable of accepting user inputs associated with a request for data from the cameras 1008. In other examples, the interface 1012 may have a software component, or may be associated with a command received wirelessly from another source, such as from the mobile computing system 1026.

The image processor 1006 includes circuitry to receive signals from the cameras 1008 and process those signals from the cameras 1008 into a format suitable for storage in the memory 1024 or for transmission to the mobile computing system 1026. In one or more examples, the image processor 1006 (e.g., video processor) comprises a microprocessor integrated circuit (IC) customized for processing sensor data from the cameras 1008, along with volatile memory used by the microprocessor in operation.

The low-power circuitry 1004 includes the low-power processor 1014 and the low-power wireless circuitry 1018. These elements of the low-power circuitry 1004 may be implemented as separate elements or may be implemented on a single IC as part of a system on a single chip. The low-power processor 1014 includes logic for managing the other elements of the head worn XR system 100. As described above, for example, the low-power processor 1014 may accept user input signals from the interface 1012. The low-power processor 1014 may also be configured to receive input signals or instruction communications from the mobile computing system 1026 via the low-power wireless connection 1036. The low-power wireless circuitry 1018 includes circuit elements for implementing a low-power wireless communication system. Bluetooth™ Smart, also known as Bluetooth™ low energy, is one standard implementation of a low power wireless communication system that may be used to implement the low-power wireless circuitry 1018. In other examples, other low power communication systems may be used.

The high-speed circuitry 1020 includes a high-speed processor 1022, a memory 1024, and a high-speed wireless circuitry 1028. The high-speed processor 1022 may be any processor capable of managing high-speed communications and operation of any general computing system used for the data processor 1002. The high-speed processor 1022 includes processing resources used for managing high-speed data transfers on the high-speed wireless connection 1034 using the high-speed wireless circuitry 1028. In some examples, the high-speed processor 1022 executes an operating system such as a LINUX operating system or other such operating system such as the operating system 912 of FIG. 9. In addition to any other responsibilities, the high-speed processor 1022 executing a software architecture for the data processor 1002 is used to manage data transfers with the high-speed wireless circuitry 1028. In some examples, the high-speed wireless circuitry 1028 is configured to implement Institute of Electrical and Electronic Engineers (IEEE) 802.11 communication standards, also referred to herein as Wi-Fi. In other examples, other high-speed communications standards may be implemented by the high-speed wireless circuitry 1028.

The memory 1024 includes any storage device capable of storing camera data generated by the cameras 1008 and the image processor 1006. While the memory 1024 is shown as integrated with the high-speed circuitry 1020, in other examples, the memory 1024 may be an independent standalone element of the data processor 1002. In some such examples, electrical routing lines may provide a connection through a chip that includes the high-speed processor 1022 from image processor 1006 or the low-power processor 1014 to the memory 1024. In other examples, the high-speed processor 1022 may manage addressing of the memory 1024 such that the low-power processor 1014 will boot the high-speed processor 1022 any time that a read or write operation involving the memory 1024 is desired.

The tracking component 1040 estimates a pose of the head worn XR system 100. For example, the tracking component 1040 uses image data and associated inertial data from the cameras 1008 and the position component interfaces 840, as well as GPS data, to track a location and determine a pose of the head worn XR system 100 relative to a frame of reference (e.g., real-world scene environment). The tracking component 1040 continually gathers and uses updated sensor data describing movements of the head worn XR system 100 to determine updated three-dimensional poses of the head worn XR system 100 that indicate changes in the relative position and orientation relative to physical objects in the real-world scene environment. The tracking component 1040 permits visual placement of virtual objects relative to physical objects by the head worn XR system 100 within the field of view of the user via the displays 1010.

The GPU & display driver 1038 may use the pose of the head worn XR system 100 to generate frames of virtual content or other content to be presented on the displays 1010 when the head worn XR system 100 are functioning in a traditional augmented reality mode. In this mode, the GPU & display driver 1038 generates updated frames of virtual content based on updated three-dimensional poses of the head worn XR system 100, which reflect changes in the position and orientation of the user in relation to physical objects in the user's real-world scene environment.

One or more functions or operations described herein may also be performed in an application resident on the head worn XR system 100 or on the mobile computing system 1026, or on a remote server. For example, one or more functions or operations described herein may be performed by one of the applications 906 such as messaging application 946.

Figure 11:
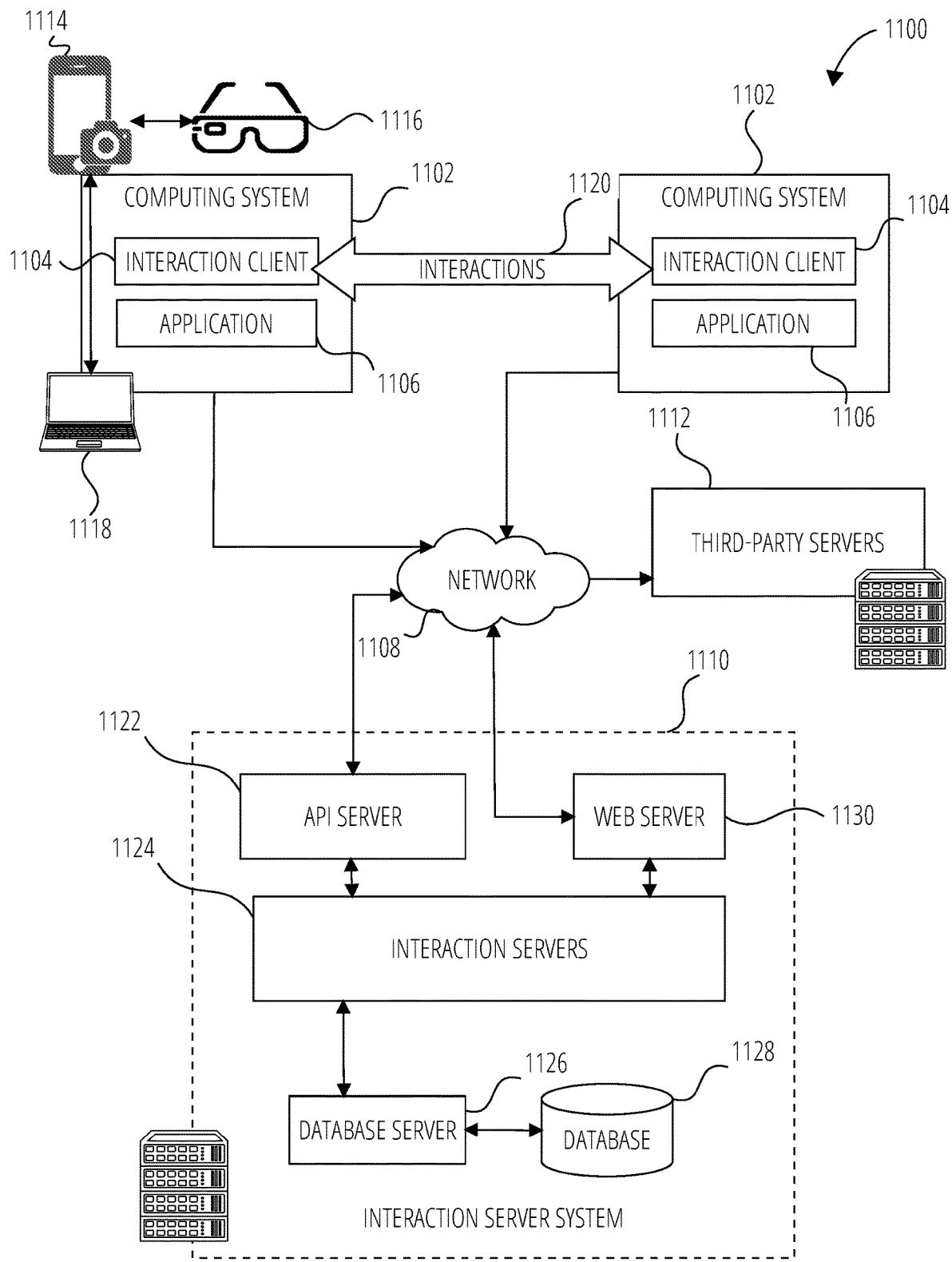
FIG. 11 is a diagrammatic representation of a networked environment in which examples of the present disclosure may be deployed, according to some examples.

FIG. 11 is a block diagram showing an example interaction system 1100 for facilitating interactions (e.g., exchanging text messages, conducting text audio and video calls, or playing games) over a network. The interaction system 1100 includes multiple computing systems 1102, each of which hosts multiple applications, including an interaction client 1104 and other applications 1106. Each interaction client 1104 is communicatively coupled, via one or more communication networks including a network 1108 (e.g., the Internet), to other instances of the interaction client 1104 (e.g., hosted on respective other computing systems 1102), an interaction server system 1110 and third-party servers 1112). An interaction client 1104 can also communicate with locally hosted applications 1106 using Applications Program Interfaces (APIs).

Each computing system 1102 may comprise one or more user devices, such as a mobile device 1114, head-worn XR system 1116, and a computer client device 1118 that are communicatively connected to exchange data and messages.

An interaction client 1104 interacts with other interaction clients 1104 and with the interaction server system 1110 via the network 1108. The data exchanged between the interaction clients 1104 (e.g., interactions 1120) and between the interaction clients 1104 and the interaction server system 1110 includes functions (e.g., commands to invoke functions) and payload data (e.g., text, audio, video, or other multimedia data).

The interaction server system 1110 provides server-side functionality via the network 1108 to the interaction clients 1104. While certain functions of the interaction system 1100 are described herein as being performed by either an interaction client 1104 or by the interaction server system 1110, the location of certain functionality either within the interaction client 1104 or the interaction server system 1110 may be a design choice. For example, it may be technically preferable to initially deploy particular technology and functionality within the interaction server system 1110 but to later migrate this technology and functionality to the interaction client 1104 where a computing system 1102 has sufficient processing capacity.

The interaction server system 1110 supports various services and operations that are provided to the interaction clients 1104. Such operations include transmitting data to, receiving data from, and processing data generated by the interaction clients 1104. This data may include message content, client device information, geolocation information, media augmentation and overlays, message content persistence conditions, social network information, and live event information. Data exchanges within the interaction system 1100 are invoked and controlled through functions available via user interfaces (UIs) of the interaction clients 1104.

Turning now specifically to the interaction server system 1110, an Application Program Interface (API) server 1122 is coupled to and provides programmatic interfaces to Interaction servers 1124, making the functions of the Interaction servers 1124 accessible to interaction clients 1104, other applications 1106 and third-party server 1112. The Interaction servers 1124 are communicatively coupled to a database server 1126, facilitating access to a database 1128 that stores data associated with interactions processed by the Interaction servers 1124. Similarly, a web server 1130 is coupled to the Interaction servers 1124 and provides web-based interfaces to the Interaction servers 1124. To this end, the web server 1130 processes incoming network requests over the Hypertext Transfer Protocol (HTTP) and several other related protocols.

The Application Program Interface (API) server 1122 receives and transmits interaction data (e.g., commands and message payloads) between the Interaction servers 1124 and the computing systems 1102 (and, for example, interaction clients 1104 and other application 1106) and the third-party server 1112. Specifically, the Application Program Interface (API) server 1122 provides a set of interfaces (e.g., routines and protocols) that can be called or queried by the interaction client 1104 and other applications 1106 to invoke functionality of the Interaction servers 1124. The Application Program Interface (API) server 1122 exposes various functions supported by the Interaction servers 1124, including account registration; login functionality; the sending of interaction data, via the Interaction servers 1124, from a particular interaction client 1104 to another interaction client 1104; the communication of media files (e.g., images or video) from an interaction client 1104 to the Interaction servers 1124; the settings of a collection of media data (e.g., a story); the retrieval of a list of friends of a user of a computing system 1102; the retrieval of messages and content; the addition and deletion of entities (e.g., friends) to an entity graph (e.g., a social graph); the location of friends within a social graph; and opening an application event (e.g., relating to the interaction client 1104).

Returning to the interaction client 1104, features and functions of an external resource (e.g., a linked application 1106 or applet) are made available to a user via an interface of the interaction client 1104. In this context, "external" refers to the fact that the application 1106 or applet is external to the interaction client 1104. The external resource is often provided by a third party but may also be provided by the creator or provider of the interaction client 1104. The interaction client 1104 receives a user selection of an option to launch or access features of such an external resource. The external resource may be the application 1106 installed on the computing system 1102 (e.g., a "native app"), or a small-scale version of the application (e.g., an "applet") that is hosted on the computing system 1102 or remote of the computing system 1102 (e.g., on third-party servers 1112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 1104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 1104 determines whether the selected external resource is a web-based external resource or a locally-installed application 1106. In some cases, applications 1106 that are locally installed on the computing system 1102 can be launched independently of and separately from the interaction client 1104, such as by selecting an icon corresponding to the application 1106 on a home screen of the computing system 1102. Small-scale versions of such applications can be launched or accessed via the interaction client 1104 and, in some examples, no or limited portions of the small-scale application can be accessed outside of the interaction client 1104. The small-scale application can be launched by the interaction client 1104 receiving, from a third-party server 1112 for example, a markup-language document associated with the small-scale application and processing such a document.

In response to determining that the external resource is a locally-installed application 1106, the interaction client 1104 instructs the computing system 1102 to launch the external resource by executing locally-stored code corresponding to the external resource. In response to determining that the external resource is a web-based resource, the interaction client 1104 communicates with the third-party servers 1112 (for example) to obtain a markup-language document corresponding to the selected external resource. The interaction client 1104 then processes the obtained markup-language document to present the web-based external resource within a user interface of the interaction client 1104.

The interaction client 1104 can notify a user of the computing system 1102, or other users related to such a user (e.g., "friends"), of activity taking place in one or more external resources. For example, the interaction client 1104 can provide participants in a conversation (e.g., a chat session) in the interaction client 1104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 1104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 1104. The external resource can selectively include different media items in the responses, based on a current context of the external resource.

The interaction client 1104 can present a list of the available external resources (e.g., applications 1106 or applets) to a user to launch or access a given external resource. This list can be presented in a context-sensitive menu. For example, the icons representing different ones of the application 1106 (or applets) can vary based on how the menu is launched by the user (e.g., from a conversation interface or from a non-conversation interface).

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "machine-readable medium" refers to both machine-storage media and transmission media. Thus, the terms include both storage devices/media and carrier waves/modulated data signals. The terms "machine-readable medium," "machine-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. An eXtended Reality (XR) display system comprising:
   a Light Emitting Diode (LED) display driver;
   a LED near-eye display element operatively coupled to the LED display driver, the LED near-eye display element comprising one or more motors and an LED array operably connected to the one or more motors;
   one or more processors; and
   a memory operably connected to the one or more processors, the memory storing executable instructions that when executed by a machine, cause the XR display system to perform operations comprising:
   receiving, by the LED display driver, video data of an XR application, the video data comprising a rendered virtual object of an XR experience provided by the XR application;
   generating, by the LED display driver, LED array control signals based on the video data, the LED array control signals causing one or more LEDs of the LED array to be energized in a sequence;
   generating, by the LED display driver, synchronized motor control signals based on the video data, the synchronized motor control signals causing the one or more motors to be powered in synchronization with the energizing of the one or more LEDs; and
   simultaneously communicating, by the LED display driver, the LED array control signals to the LED array and the synchronized motor control signals to the one or more motors causing the LED near-eye display element to display the rendered virtual object to a user of an XR system.

2. The XR display system of claim 1, wherein the one or more motors sweep the LED array through a circular swept area.

3. The XR display system of claim 1, wherein the one or more motors sweep the LED array through a sector of a circular swept area.

4. The XR display system of claim 1, wherein the one or more motors sweep the LED array through a rectangular swept area.

5. The XR display system of claim 4, wherein the LED array is operably coupled to the one or more motors by one or more traction belts.

6. The XR display system of claim 5, wherein the LED array is operably coupled to the one or more traction belts by one or more rotatable connections.

7. The XR display system of claim 1, wherein the LED array of the LED near-eye display element is operably coupled to the one or more motors by a magnetic ring gear and one or more magnetic pinion gears.

8. The XR display system of claim 1, wherein the LED array is powered by inductive coupling.

9. The XR display system of claim 1, wherein the LED array is controlled via a wireless communication protocol.

10. The XR display system of claim 1, wherein the XR display system is a component of a head-worn XR system.

11. An XR display system comprising:
    an LED display driver;
    a first Light Emitting Diode (LED) near-eye display element operatively coupled to the LED display driver, the first LED near-eye display element comprising first one or more motors and a first LED array operably connected to the first one or more motors;
    a second LED near-eye display element operatively coupled to the LED display driver, the second LED near-eye display element comprising second one or more motors and a second LED array operably connected to the second one or more motors;
    one or more processors; and
    a memory operably connected to the one or more processors, the memory storing executable instructions that when executed by a machine, cause the XR display system to perform operations comprising:
    receiving, by the LED display driver, binocular video data of an XR application, the binocular video data comprising a rendered virtual object of an XR experience provided by the XR application;
    generating, by the LED display driver, LED array control signals based on the binocular video data, the LED array control signals causing first one or more LEDs of the first LED array to be energized in a first sequence, and causing second one or more LEDs of the second LED array to be energized in a second sequence;
    generating, by the LED display driver, synchronized motor control signals based on the binocular video data, the synchronized motor control signals causing the first one or more motors to be powered in synchronization with the energizing of the first one or more LEDs, and causing the second one or more motors to be powered in synchronization with the energizing of the second one or more LEDs; and
    simultaneously communicating, by the LED display driver, the LED array control signals to the first one or more LED arrays and the second one or more LED arrays, and communicating the synchronized motor control signals to the first one or more motors and the second one or more motors causing the first LED near-eye display element and second LED near-eye display element to display the rendered virtual object to a user of an XR system.

12. The XR display system of claim 11, wherein the first one or more motors sweep the first LED array through a first circular swept area and the second one or more motors sweep the second LED array through a second circular swept area.

13. The XR display system of claim 11, wherein the first one or more motors sweep the first LED array through a first sector of a circular swept area and the second one or more motors sweep the second LED array through a second sector of a circular swept area.

14. The XR display system of claim 11, wherein the first one or more motors sweep the first LED array through a first rectangular swept area and the second one or more motors sweep the second LED array through a second rectangular swept area.

15. The XR display system of claim 14, wherein the first LED array is operably connected to the first one or more motors by first one or more traction belts and the second LED array is operably connected to the second one or more motors by second one or more traction belts.

16. The XR display system of claim 14, wherein the first LED array is connected to the first one or more traction belts by first one or more rotatable connections and the second LED array is connected to the second one or more traction belts by second one or more rotatable connections.

17. The XR display system of claim 11, wherein the first LED array is operably connected to the first one or more motors by a first magnetic ring gear and first one or more magnetic pinion gears and the second LED array is operably connected to the second one or more motors by a second magnetic ring gear and second one or more magnetic pinion gears.

18. The XR display system of claim 11, wherein the LED array is powered by inductive coupling.

19. The XR display system of claim 11, wherein the XR display system is a component of a head-worn XR system.

20. A non-transitory machine-readable storage medium, the non-transitory machine-readable storage medium including instructions that when executed by a machine, cause the machine to:

receive binocular video data of an XR application, the binocular video data comprising a rendered virtual object of an XR experience provided by the XR application;

generate LED array control signals based on the binocular video data, the LED array control signals causing first one or more LEDs of a first LED array operably connected to first one or more motors to be energized in a first sequence, and causing second one or more LEDs of a second LED array operably connected to second one or more motors to be energized in a second sequence;

generate synchronized motor control signals based on the binocular video data, the synchronized motor control signals causing the first one or more motors to be powered in synchronization with the energizing of the first one or more LEDs, and causing the second one or more motors to be powered in synchronization with the energizing of the second one or more LEDs; and simultaneously communicate the LED array control signals to first one or more LED arrays and second one or more LED arrays, and communicating the synchronized motor control signals to the first one or more motors and the second one or more motors, causing the first LED near-eye display element and second LED near-eye display element to display the rendered virtual object to a user of an XR system.

* * * * *